US010778775B2

(12) United States Patent
Lear et al.

(10) Patent No.: US 10,778,775 B2
(45) Date of Patent: Sep. 15, 2020

(54) CONTROL OF NETWORK CONNECTED DEVICES

(71) Applicant: Cisco Technology, Inc., San Jose, CA (US)

(72) Inventors: Eliot Lear, Wetzikon (CH); Brian Weis, San Jose, CA (US); Mordechai Alon, Or Yehuda (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 508 days.

(21) Appl. No.: 15/333,313

(22) Filed: Oct. 25, 2016

(65) Prior Publication Data

US 2018/0115611 A1  Apr. 26, 2018

(51) Int. Cl.
*H04L 29/08* (2006.01)
*H04L 29/12* (2006.01)
(Continued)

(52) U.S. Cl.
CPC ............ *H04L 67/125* (2013.01); *H04L 41/28* (2013.01); *H04L 61/1511* (2013.01); *H04L 61/1541* (2013.01); *H04L 63/10* (2013.01); *H04L 63/20* (2013.01); *H04L 61/2514* (2013.01); *H04L 61/2582* (2013.01)

(58) Field of Classification Search
CPC ....... H04L 67/125; H04L 63/10; H04L 63/20; H04L 61/1541; H04L 61/1511; H04L 61/2514; H04L 61/2582; H04L 41/28
See application file for complete search history.

(56) References Cited

U.S. PATENT DOCUMENTS 8,561,147 B2 * 10/2013 Lee ..................... H04L 12/2818
                                                   713/153
8,812,670 B2 *  8/2014 Haddad ............... H04L 12/2834
                                                   709/225
(Continued)

FOREIGN PATENT DOCUMENTS

WO        2013123445 A1    8/2013

OTHER PUBLICATIONS

E. Lear, "Manufacturer Usage Description Framework", draft-lear-mud-framework-00, Network Working Group, Internet-Draft, Jan. 21, 2016, 11 pages.
(Continued)

*Primary Examiner* — Patrice L Winder
(74) *Attorney, Agent, or Firm* — Edell, Shapiro & Finnan, LLC

(57) ABSTRACT

Presented herein are techniques in which one or more network devices can use information provided by a special purpose network connected device to retrieve a usage profile (i.e., configuration file) associated with the special purpose network connected device. The retrieved usage profile, which includes/describes preselected (predetermined) usage descriptions associated with the special purpose network connected device, can then be used to configure one or more network devices. For example, the predetermined usage descriptions associated with the special purpose network connected device can be instantiated and enforced at a network device or the predetermined usage descriptions can be used for auditing the special purpose network connected device (e.g., monitoring of traffic within the network).

20 Claims, 9 Drawing Sheets

(51) Int. Cl.
*H04L 29/06* (2006.01)
*H04L 12/24* (2006.01)

(56) References Cited

U.S. PATENT DOCUMENTS

| | | | | |
|---|---|---|---|---|
| 9,032,215 | B2* | 5/2015 | Kalofonos | H04L 12/2803 709/228 |
| 9,204,345 | B1* | 12/2015 | Roskind | H04L 63/101 |
| 9,208,295 | B2 | 12/2015 | Cam-Winget et al. | |
| 9,425,979 | B2* | 8/2016 | Cregg | H04L 63/062 |
| 9,467,449 | B2* | 10/2016 | Defrance | H04L 12/2836 |
| 9,485,231 | B1* | 11/2016 | Reese | H04L 63/02 |
| 9,531,559 | B1* | 12/2016 | Vlaminck | H04W 4/70 |
| 9,569,587 | B2* | 2/2017 | Ansari | H04L 63/08 |
| 9,571,297 | B2* | 2/2017 | Sadhu | G06F 19/00 |
| 9,584,482 | B2* | 2/2017 | Burns | H04L 12/66 |
| 9,596,154 | B2* | 3/2017 | Zhou | H04L 41/0893 |
| 9,858,739 | B1* | 1/2018 | Johnson | H04W 76/10 |
| 9,942,235 | B2* | 4/2018 | Bagasra | H04L 63/101 |
| 10,009,351 | B2* | 6/2018 | Choi | H04L 63/102 |
| 10,009,410 | B2* | 6/2018 | Huang | H04L 67/06 |
| 10,038,990 | B2* | 7/2018 | Boran | H04W 4/70 |
| 10,064,062 | B2* | 8/2018 | Idnani | H04W 12/08 |
| 10,135,790 | B2* | 11/2018 | Lapidous | H04L 63/0281 |
| 10,142,345 | B2* | 11/2018 | Bae | H04L 9/3226 |
| 10,149,370 | B2* | 12/2018 | Greene | H03K 17/962 |
| 10,257,159 | B2* | 4/2019 | Kim | H04L 43/08 |
| 10,313,351 | B2* | 6/2019 | Meredith | H04L 63/101 |
| 2007/0112909 | A1* | 5/2007 | Miyamoto | H04L 12/281 709/200 |
| 2008/0072313 | A1* | 3/2008 | Bodlaender | H04L 63/101 726/17 |
| 2014/0118123 | A1* | 5/2014 | Lim | G08C 19/00 340/12.53 |
| 2014/0365512 | A1 | 12/2014 | Thomson et al. | |
| 2015/0134954 | A1* | 5/2015 | Walley | H04L 63/08 713/168 |
| 2015/0135260 | A1 | 5/2015 | Ilyadis et al. | |
| 2016/0285979 | A1* | 9/2016 | Wang | H04L 67/16 |
| 2016/0366183 | A1* | 12/2016 | Smith | H04L 63/101 |
| 2017/0033984 | A1 | 2/2017 | Lear et al. | |
| 2017/0126525 | A1* | 5/2017 | Coates | H04L 43/0817 |
| 2017/0181056 | A1* | 6/2017 | Hemphill | H04L 41/0806 |
| 2017/0238235 | A1* | 8/2017 | Keidar | H04W 48/02 370/338 |
| 2017/0310666 | A1* | 10/2017 | Six | H04L 63/08 |
| 2017/0331860 | A1* | 11/2017 | Ofversten | H04W 4/70 |
| 2018/0034913 | A1* | 2/2018 | Matthieu | H04L 67/125 |
| 2018/0343252 | A1* | 11/2018 | Evesti | H04W 4/70 |
| 2018/0367617 | A1* | 12/2018 | Moustafa | H04L 67/00 |

OTHER PUBLICATIONS

S. Cheshire et al., "Multicast DNS", Internet Engineering Task Force (IETF), Request for Comments: 6762, Category: Standards Track, ISSN: 2070-1721, Feb. 2013, 70 pages.

D. Wing, Ed. et al., "Port Control Protocol (PCP)", Internet Engineering Task Force (IETF), Request for Comments: 6887, Category: Standards Track, ISSN: 2070-1721, Apr. 2013, 88 pages.

J. Rosenberg et al., "Session Traversal Utilities for NAT (STUN)", Network Working Group, Request for Comments: 5389, Obsoletes: 3489, Category: Standards Track, Oct. 2008, 51 pages.

* cited by examiner

CONTROL OF NETWORK CONNECTED DEVICES

TECHNICAL FIELD

The present disclosure relates to controlling network connected devices.

BACKGROUND

The Internet of Things (IoT) is a general term used to describe the addition of networking capabilities to physical objects or "things" that serve some purpose or function outside of computing and/or networking technologies (i.e., traditionally "unconnected" or "offline" devices). In general, these "things," sometimes referred to as IoT enabled-devices, IoT devices, or special purpose network connected devices, are embedded with electronics, software, and network interfaces, which enables the physical objects to send and/or receive data packets over a network.

The rapid rise of IoT has resulted in steadily increasing numbers and types of special purpose network connected devices. It is possible that many of these special purpose network connected devices will have little or no associated security capabilities (e.g., no authorization, authentication, and/or encryption capabilities) and, as such, such devices are at risk of being attacked by a malicious entity.

DESCRIPTION OF EXAMPLE EMBODIMENTS

Overview

Presented herein are techniques for enabling management of a special purpose network connected device by a local or remote controller device. For example, a security controller associated with a local network establishes an authenticated communication channel with a one or more home gateway devices of the local network. The security controller receives a request from a device controller to access one or more types of special purpose network connected devices in the local network. In response to the request, the security controller sends the device controller an indication of at least one special purpose network connected device in the local network that the device controller is authorized to access. The security controller then installs one or more access control directives (e.g., access control lists) on one or more home gateway devices indicating that the device controller is permitted to access the at least one special purpose network connected device.

Example Embodiments

Certain special purpose network connected devices, sometimes referred to herein as Internet of Things (IoT) enabled-devices or simply IoT devices, require only limited network exposure, such as access to a specific service or controller. However, other special purpose network connected devices may require access to other types of devices on the network. When a special purpose network connected device is overly exposed, there is a risk of that device being maliciously attacked. Consequently, it is important to identify which devices are allowed to control operations of a special purpose network connected device.

Figure 1:
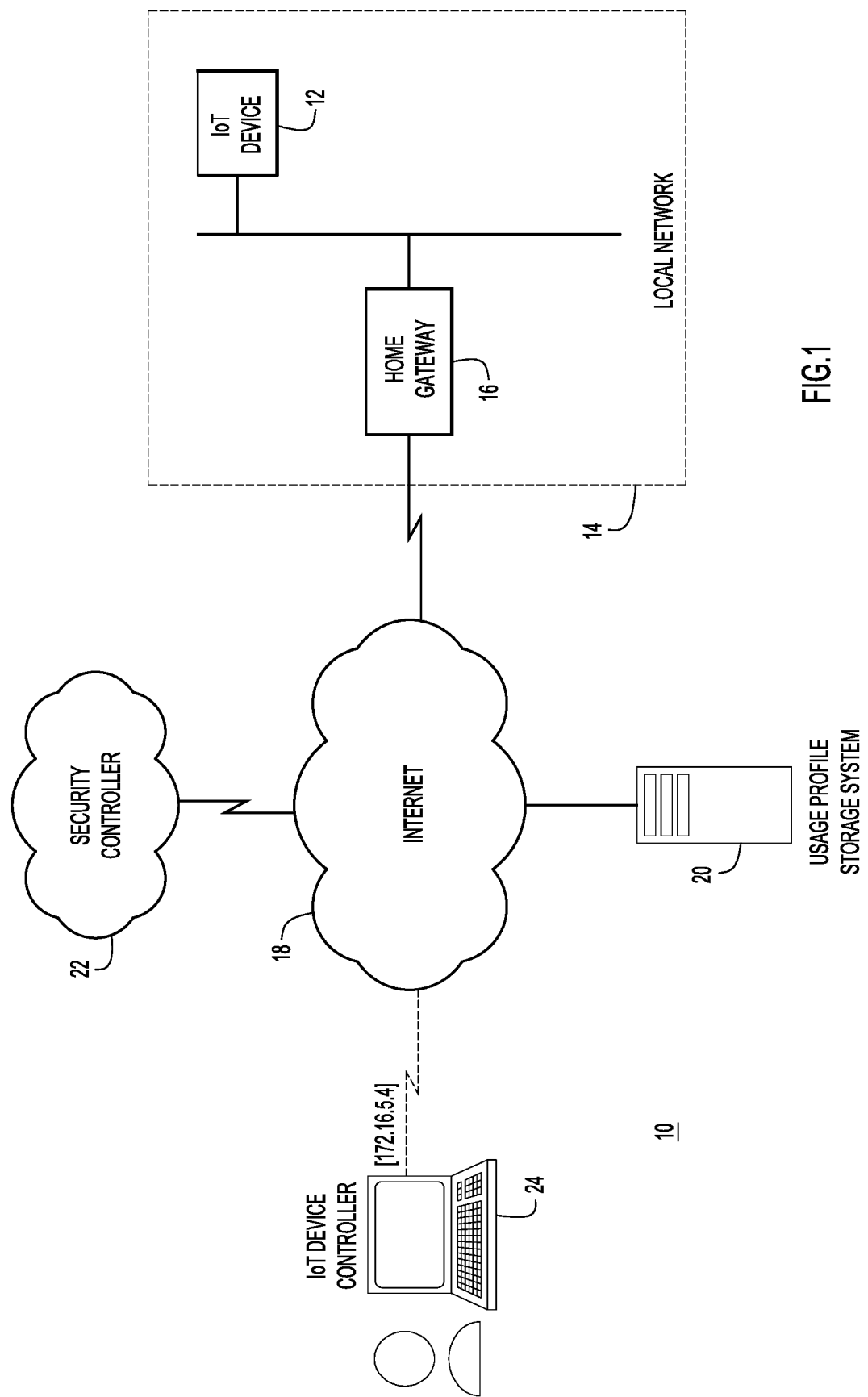
FIG. 1 is a block diagram of an arrangement in which a controller is enabled to manage a special purpose network connected device, according to an example embodiment.

Reference is first made to FIG. 1 that illustrates an arrangement 10 comprising a special purpose network connected device 12, which is sometimes referred to herein as a smart device, an IoT enabled-device, or simply IoT device. The IoT device 12 is located in a local (home) network 14 that also comprises, among other elements, a home gateway device (e.g., home router) 16 that connects the local network 14 to a wide area network 18 (e.g., the Internet). The home gateway 16 may be, for example, a router, firewall, intrusion prevention device, or other security appliance operating as a policy enforcement point that imposes data-plane control through one or more access control directives, such as policies, auditing commands, access control lists (ACLs), etc. As used herein, IoT devices (special purpose network connected devices) are physical things or objects that serve a single purpose or function or a small number of purposes or functions, such as refrigerators, thermostats, light fixtures, home control systems (e.g., security cameras), baby monitors, printers, door locks or door bells, etc. In IoT devices, computing and/or networking functions are only ancillary/supplemental to the primary purpose/function of the device. For a variety of reasons, such as costs or device age, IoT devices may have limited computing and/or networking capabilities.

In general, an IoT device, such as the IoT device 12, can be configured to operate in accordance with a "usage description," sometimes referred to as a "manufacturer usage description" or MUD. In the examples presented herein, the term "manufacturer" is used loosely to refer to any entity or organization that is allowed to state how an IoT device is intended to be used (i.e., some entity in the supply chain of that device that will take responsibility for informing the network about that purpose). For example, in the context of a light fixture, the "manufacturer" may be the actual light fixture manufacturer. However, in the context of a smarter device having a built in Linux stack, the "manufacturer" may be integrator of that device. Merely for ease of illustration, the examples presented herein will refer to a manufacturer usage description (MUD) framework for enabling control of IoT devices, such as IoT device 12 in FIG. 1. In the examples presented herein, the IoT device 12 is the resource to which access is to be enabled.

Also shown in FIG. 1 is an IoT device controller 24 that, in this example, is a remote device located outside of the local network 14. The IoT device controller 24 is the device that is to be granted access to the IoT device 12. The IoT device controller 24 may be any computing device, such as a laptop computer, tablet computer, mobile phone, server, etc. In certain examples, the IoT device controller 24 runs/executes a manufacturer control application (not shown in FIG. 1) that is associated with the IoT device 12. Although FIG. 1 illustrates the IoT device controller 24 as being a remote device, it is to be appreciated that the IoT device controller 24 may alternatively be a local device within the local network 14. It is also to be appreciated that the IoT device controller 24 may not have stable network addresses (e.g., Internet Protocol (IP) address) or host name.

FIG. 1 also illustrates a service provider security controller (security controller) 22, which is sometimes referred to herein as MUD controller. The security controller 22 provides cybersecurity protection for the various devices connected to the local network 14, including providing one or more access control directives (e.g., access control lists (ACLs)) to the home gateway 16. Also shown in FIG. 1 is a usage profile storage system 20, which is sometimes referred to herein as MUD file system. The usage profile storage system 20 includes one or more devices (e.g., servers) that are configured to store "usage profiles" (MUD profiles) for IoT devices associated with one or more manufacturers. In general, the usage profiles are configuration profiles or templates for the IoT devices and identify (i.e., include, describe, and/or reference) preselected (predetermined) usage descriptions associated with the respective IoT device.

A number of different usage descriptions may be set for the IoT device 12. These usage descriptions may include, for example, a description of the role of the IoT device, access control policies/directives, quality of service (QoS) policies (e.g., traffic prioritization), signature-based policies (e.g., SIP type of signatures), indication of network required services (e.g., web/Transport Layer Security (TLS) proxy functions, malware scanning, Domain Name System (DNS), network authentication, etc.), protocol usage restrictions, application (type) restrictions, and/or other policies. In certain examples, the predetermined usage descriptions are referred to herein as being "manufacturer-driven" or "manufacturer-based" usage descriptions because they may indicate the manufacturer's operational requirements and/or intent for the corresponding special purpose network connected device. In one example, the usage profile storage system 20 is part of a website (e.g., a webpage) associated with a manufacturer of an IoT device.

In general, a usage description is a mechanism by which a manufacturer communicates configuration recommendations to local deployments, such as the local network 14 of FIG. 1. One aspect of the usage descriptions is the concept of a "controller" class/field, which is a field for the network address and other information for a controller device, sometimes referred to herein as IoT device controller, that is able to access the IoT device 12. At the initial configuration, the actual address and other information for the IoT controller is unknown (i.e., the "controller" class is an abstraction of the actual controller IoT device that will be authorized to access the IoT device 12). However, once the usage profile is instantiated (e.g., at the home gateway 16), the actual network address and other information for the IoT device controller needs to be appear in an access-list at the home gateway 16.

In one example, the usage descriptions can be retrieved using Uniform Resource Identifiers (URIs). A URI is a unique string of characters used to identify the name and location of a file or resource. A URI may comprise a string of characters for the filename and may also contain the path to the directory of the file. As such, when the IoT device 12 is initiated, the IoT device sends a URI in an announcement message to the security controller 22. Based on the URI, which identifies the name and location of the usage profile associated with IoT device 12, the security controller 22 retrieves the usage description(s) associated with the IoT device 12 from the usage profile storage system 20. The security controller 22 then installs/instantiates the usage description at the network devices, such as home gateway 16, that form the local network 14.

Upon instantiation of a usage description at the home gateway 16, the home gateway does not have the network address for the IoT device controller 24. This information is also unknown to the IoT device 12. As such, the home gateway 16 has no way of knowing which remote and/or local devices should be allowed access to the IoT device 12. Presented herein are techniques for automatically providing the home gateway 16 with the network address for devices, namely IoT device controller 24, that should be allowed to access and manage the IoT device 12 (i.e., automatically populate the "controller" field of a usage description). As a result, the access control directives (e.g., access control lists (ACLs)) in the home gateway 16 that control access to the IoT device 12 can be automatically populated and updated, as necessary, with the correct network address for the IoT device controller 24 so that the home gateway 16 can establish appropriate access to the IoT device 12.

In general, the techniques are able to perform at least two, and possibly three, tasks. First, the techniques presented herein provide for appropriate access control in home gateways and other policy enforcement points for both IoT devices and IoT device controllers in highly dynamic environments by keeping track of their assigned network (e.g., IP) addresses through an authenticated interface on the IoT device controller. Second, the techniques presented herein provide IoT device discovery for IoT device controllers through that same interface. Third, the techniques presented herein optionally manage any required network address translation (NAT) mappings on Customer Premise Equipment (CPE), home gateways, etc.

For ease of illustration, examples will be primarily described herein with reference to access enforcement via access control directives in the form of access control lists at the home gateway 16. It is to be appreciated that the techniques presented herein may be used with other types of access control directives. For example, in addition to installing access control lists built from a MUD file, the security controller could install policy restricting the IoT device controller to a specific network segmentation or other separation policy (e.g., VLAN), install auditing commands, etc.

Figure 2:
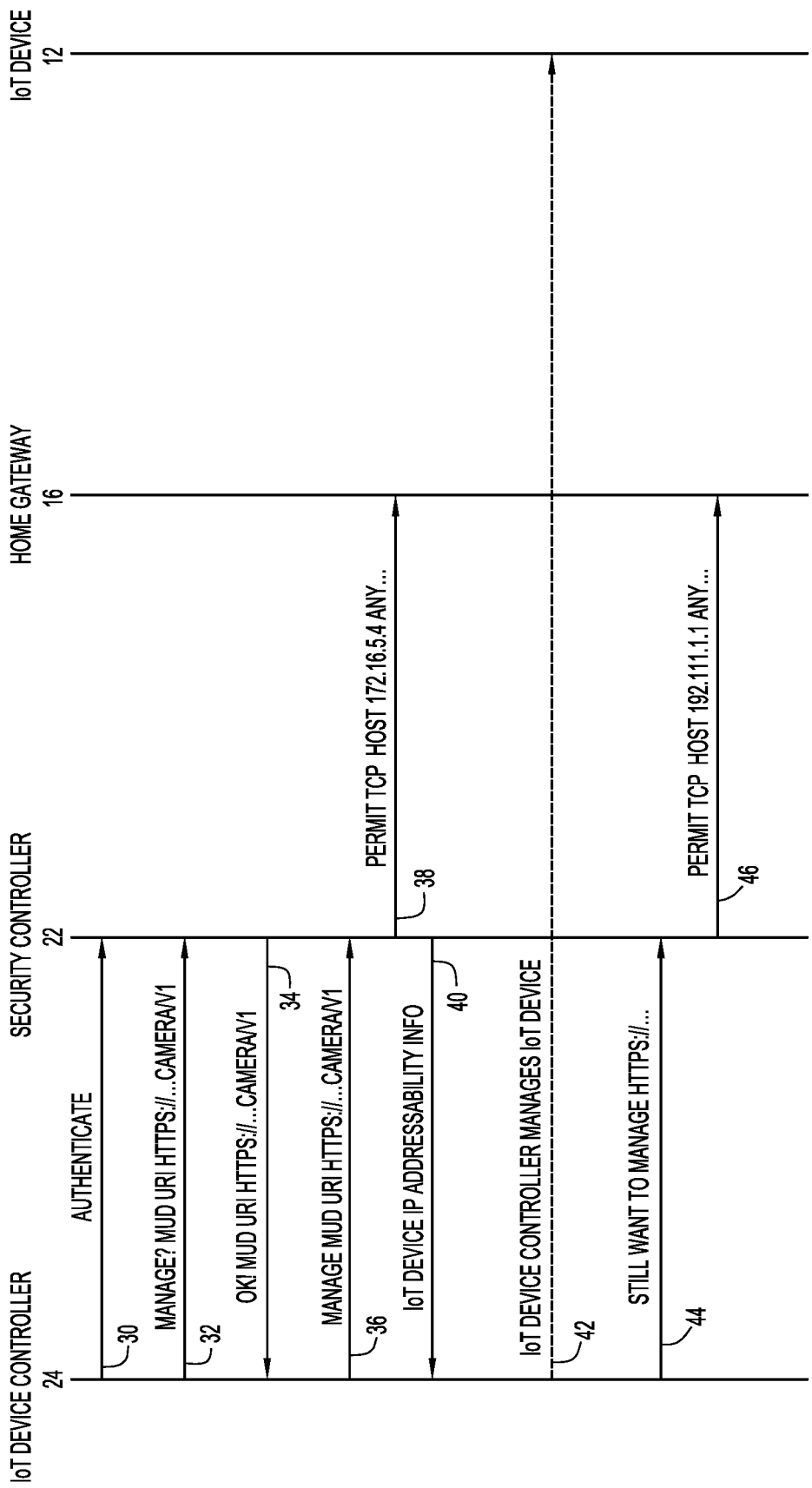
FIG. 2 is a ladder diagram illustrating a flow for enabling a controller to manage a special purpose network connected device, according to an example embodiment.

FIG. 2 is a ladder diagram illustrating an example workflow for automatically populating and maintaining the network address for the IoT device controller 12 at the home gateway 16 in the example of FIG. 1. At the beginning of the flow shown in FIG. 2, the security controller 22 is installed and the IoT device controller 24 is configured to control the IoT device 12 (e.g., installed on the IoT device controller 24 is a manufacturer control application that is associated with the IoT device 12). Additionally, the IoT device 12 has been installed and has registered with the security controller 22 and the home gateway 16 is in communication with the security controller 22.

In FIG. 2, the IoT device controller 24 first authenticates itself to the security controller 22. The IoT device controller 24 may perform this authentication in a number of different manners, such as through an authentication protocol, a Representational state transfer (REST) or RESTful application program interface (API), etc. The authentication of the IoT device controller 24 to the security controller 22 is generally shown in FIG. 2 by arrow 30.

After authentication, the IoT device controller 24 makes a request 32 (e.g., a JavaScript Object Notation (JSON)-based request) to the security controller 22 for a specified list of IoT device Uniform Resource Identifiers (URIs), such as Uniform Resource Locators (URLs). This request 32 may also optionally be a request for the IP addresses of devices associated with those URIs. Stated differently, the IoT device controller 24 sends a message to the security controller 22 indicating that the IoT device controller 24 has interest in controlling one or more types of IoT devices, and requests an indication as to whether any of those specific types of IoT devices are present in the local network 14 (i.e., here are the URIs for devices to be managed).

In response to the request 32, the security controller 22 sends a response 34 to the IoT device controller 24 that includes the URIs for IoT device types in the local network 14 that the IoT device controller 24 is authorized to manage. This response 34 may also optionally include a list of IP addresses that are associated with those URIs.

The IoT device controller 24 subsequently sends a request 36 to the security controller 22 that indicates the IoT devices that the IoT device controller 24 intends to manage. In one example, the request 36 is a RESTful call. In general, request 32 is a request for information, while request 36 is a request for authorization to manage specific IoT devices.

Upon receipt of request 36, the security controller 22 notes the network address (e.g., IP address) of the IoT device controller 24 and updates its definition of "manufacturer" for the IoT device associated with a given URI. The security controller 22 then installs the one or more access control directives on the home gateway device 16. For example, the security controller 22 may install the network address of the IoT device controller 24 in one or more access control lists on the home gateway device 16, such that the IoT device controller 24 is permitted to access the IoT device 12. That is, the security controller 22 sends to the home gateway 16 an update 38 that provides the home gateway 16 with the network address for the IoT device controller 24. The home gateway one or more access control directives (e.g., access control lists (ACLs)) are then created and/or updated accordingly to permit the IoT device controller 24 to manage the IoT device 12.

Although not shown in FIG. 2, a network address translation (NAT) mapping may also be built on any necessary firewall or other security appliance to facilitate the communication between the IoT device controller 24 and the IoT device 12. If necessary, the Port Control Protocol (PCP) THIRD_PARTY option may be used for this purpose.

Returning to the example of FIG. 2, the security controller 22 returns, to the IoT device controller 24, a list 40 of IoT devices that are currently managed by the IoT device controller 24 (i.e., a list of currently managed devices based on that controller URI). The list 40 may also include the network address information (e.g., IP address) for the managed IoT devices. In the example of FIGS. 1 and 2, this list 40 identifies the IoT device 12 and provides the IoT device controller 24 with the IP address of the IoT device 12. As shown by arrow 42, the IoT device controller 24 may then access the IoT device 12 via the home gateway 16.

In general, the IoT device controller 24 (e.g., the manufacturer control application) will supervise connectivity and periodically report, using re-authentications 44, to the security controller 22 that access to the IoT device 12 is still needed. That is, the IoT device controller 24 is periodically re-authenticated to the security controller 22 and the security controller will keep track of any network address changes for the IoT device controller 24. In the example of FIG. 2, the network address for the IoT device controller 24 changes from an initial IP address of "172.16.5.4" to an updated IP address of "192.111.1.1." When the security controller 22 detects this IP address change, the security controller 22 sends to the home gateway 16 an update 46 that includes the updated network address for the IoT device controller 24. The ACLs on the home gateway 16 are then updated accordingly to permit the IoT device controller 24 to continue to manage the IoT device 12. The IoT device controller 24 may also periodically provide access updates to the security controller 22 (e.g., when the IoT device controller 24 desires to manage new devices).

In general, the flow of FIG. 2 illustrates a method that allows an IoT device controller to control an IoT device when the IP address of the controller is not predetermined and may change. The method of access will vary based on what the manufacturer has stated in the usage description for the IoT device. This information may include the direction of the communication, the utilized transport mechanism, and what ports are utilized, etc.

Figure 3:
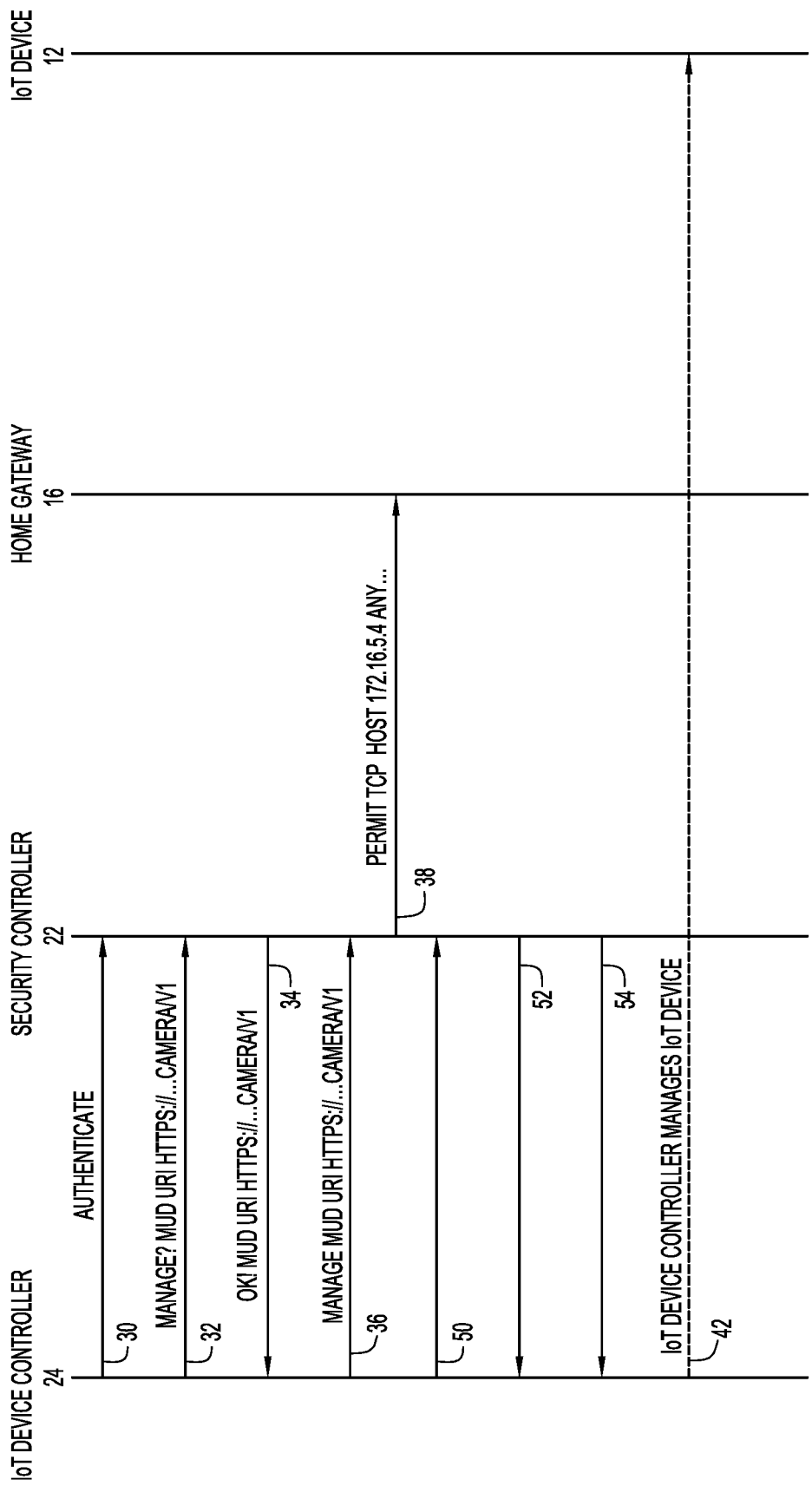
FIG. 3 is a ladder diagram illustrating another flow for enabling a controller to manage a special purpose network connected device, according to an example embodiment.

FIG. 3 is a ladder diagram illustrating an alternative workflow in which a virtual private network (VPN) tunnel is created and utilized for enabling an IoT device controller to manage an IoT device. For ease of illustration, the workflow of FIG. 3 is described with reference to the arrangement 10 of FIG. 1.

The workflow of FIG. 3 includes several of the same operations as described in the workflow of FIG. 2. In particular, the IoT device controller 24 first authenticates itself to the security controller 22 (represented in FIG. 3 by arrow 30) and then makes a request 32 to the security controller 22 for a specified list of IoT device URIs. As noted, this request 32 may also optionally be a request for the IP addresses of devices associated with those URIs. Stated differently, the IoT device controller 24 sends a message to the security controller 22 indicating that the IoT device controller 24 has interest in controlling one or more types of IoT devices and requesting an indication as to whether any of those specific types of IoT devices are present in the local network 14.

In response to the request 32, the security controller 22 sends a response 34 to the IoT device controller 24. The response 34 includes the URIs for IoT device types in the local network 14 that the IoT device controller 24 is authorized to manage. The response 34 may also optionally include a list of IP addresses that are associated with those URIs. The IoT device controller 24 subsequently sends a request 36 to the security controller 22 that indicates the IoT devices that the IoT device controller 24 intends to manage. As noted above, request 32 is a request for information, while request 36 is a request for authorization to manage specific IoT devices.

Upon receipt of request 36, the security controller 22 notes the network address (e.g., IP address) of the IoT device controller 24 and updates its definition of "manufacturer" for the IoT device associated with a given URI. The security controller 22 then installs the one or more access control directives on the home gateway device 16. For example, the security controller 22 may install the network address of the IoT device controller 24 in one or more access control lists on the home gateway device 16, such that the IoT device controller 24 is permitted to access the IoT device 12. That is, the security controller 22 sends to the home gateway 16 an update 38 that provides the home gateway 16 with the network address for the IoT device controller 24. The home gateway one or more access control directives (e.g., access control lists (ACLs)) are then created and/or updated accordingly to permit the IoT device controller 24 to manage the IoT device 12.

In this example, the IoT device controller 24 (e.g., the manufacturer control application) provides a list 50 of configured IP addresses and interface types to the security controller 22. The security controller 22 notes any appropriate existing IP address that may be used for managing the IoT device 12. If the security controller 22 determines that the home gateway 16 (or other policy enforcement point) has VPN capability, and that the IoT device controller 24 also has a compatible VPN capability, then security controller 22 will initiate VPN connectivity. In particular, the security controller 22 will return to the IoT device controller 24 a token 52 or one or more other authentication parameters, as well as an appropriate endpoint address of the home gateway or other policy enforcement device, in order to establish a VPN. The IoT device controller 24 then establishes the VPN with the home gateway 16. Once the VPN has been established, the IoT device 12 re-registers with the security controller 22 so that the security controller 22 learns of the assigned IP address.

As shown, the security controller 22 also returns a list 54 of currently managed IoT devices, based on that controller URI, to the IoT device controller 24. In the example of FIG. 3, this list 54 identifies the IoT device 12. As shown by arrow 42, the IoT device controller 24 may then access the IoT device 12. Similar to the example of FIG. 2, the IoT device controller 24 is periodically re-authenticated to the security controller 22. The security controller 22 will also keep track of any network address changes based on VPN re-establishment.

Figure 4:
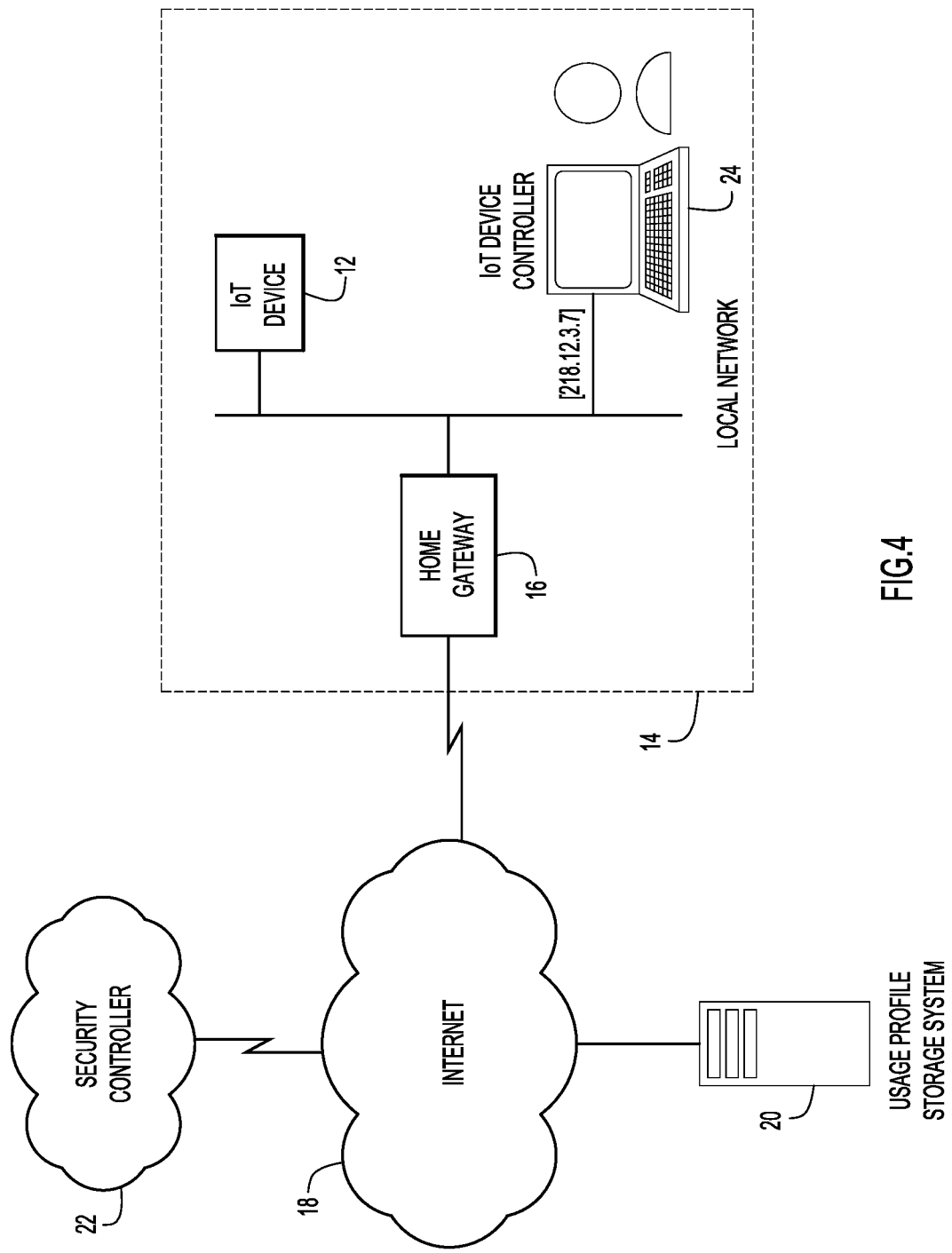
FIG. 4 is a block diagram of another arrangement in which a device is enabled to manage a special purpose network connected device, according to an example embodiment.
Figure 5:
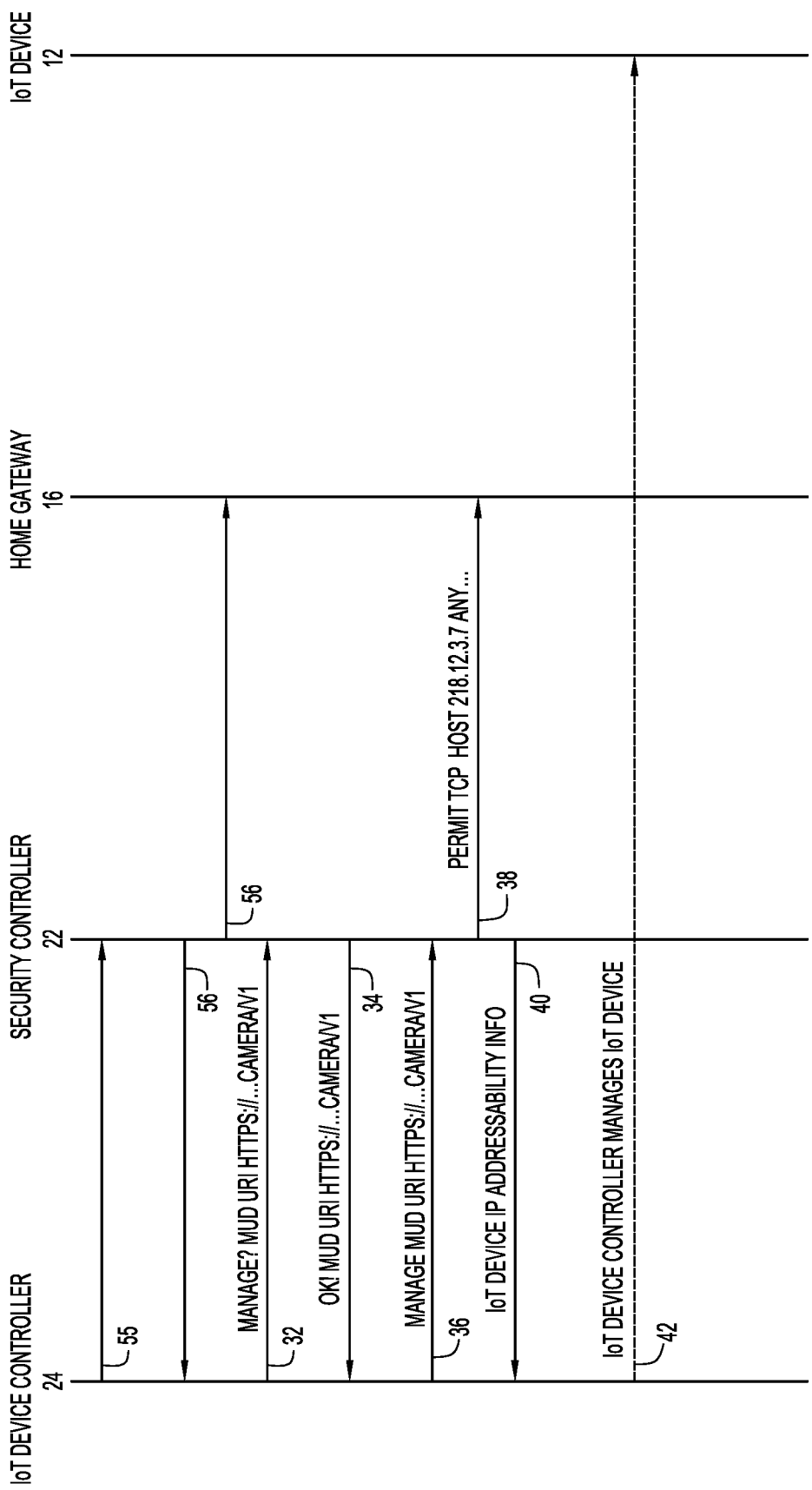
FIG. 5 is a ladder diagram illustrating a flow for enabling a device to manage a special purpose network connected device, according to an example embodiment.

As noted above, FIG. 1 illustrates an arrangement in which the IoT device controller 24 is a remote device (i.e., outside of the local network 14). FIG. 4 illustrates an alternative arrangement 60 where the IoT device controller 24 is a local device (i.e., within the local network 14) and the IoT device controller 24 (i.e., manufacturer control application) is not preconfigured for communication with the security controller 22. FIG. 5 is a ladder diagram illustrating an example workflow for automatically populating and maintaining the network address information for the IoT device controller 12 at the home gateway 16 in the example of FIG. 4.

In the example of FIGS. 4 and 5, the security controller 22 or its agent optionally announces that it is available to authenticate controllers via, for example, a Domain Name System (DNS) Service Discovery (DNS-SD), a Multicast DNS (mDNS), or other type of announcement message 56. This happens either directly or through an agent running in the local network (e.g., on a home router, switch, etc.).

The IoT device controller 24 (e.g., the manufacturer control application running on the IoT device controller 24) learns of the existence of the security controller via the announcement message 56 (e.g., the DNS-SD/mDNS packet). The flow of FIG. 5 then generally includes the operations described above in FIG. 2 (i.e., the operations associated with reference number 32, 34, 36, 38, and 40), which two exceptions. First, as shown by arrow 55, during the authentication process, the IoT device controller 24 reports its local IP address and optionally MAC address to the security controller 22. It is this address that the security controller 22 uses in the ACLs to grant access between the IoT device 12 and the IoT device controller 24. Also, when a device authenticates in the home for the first time, the security controller 22 may query the user one time via an out of band interface.

In the examples of FIGS. 4 and 5, the security controller 22 is able to distinguish whether or not requests are generated in the local network 14 because the security controller 22 is aware of the IP address of the home gateway 16. This could be due to a VPN setup between the security controller 22 and the home gateway 16 in which requests coming from local network 14 are passed, or because home gateway 16 is performing NAT on the requests coming from home gateway 16.

Figure 6:
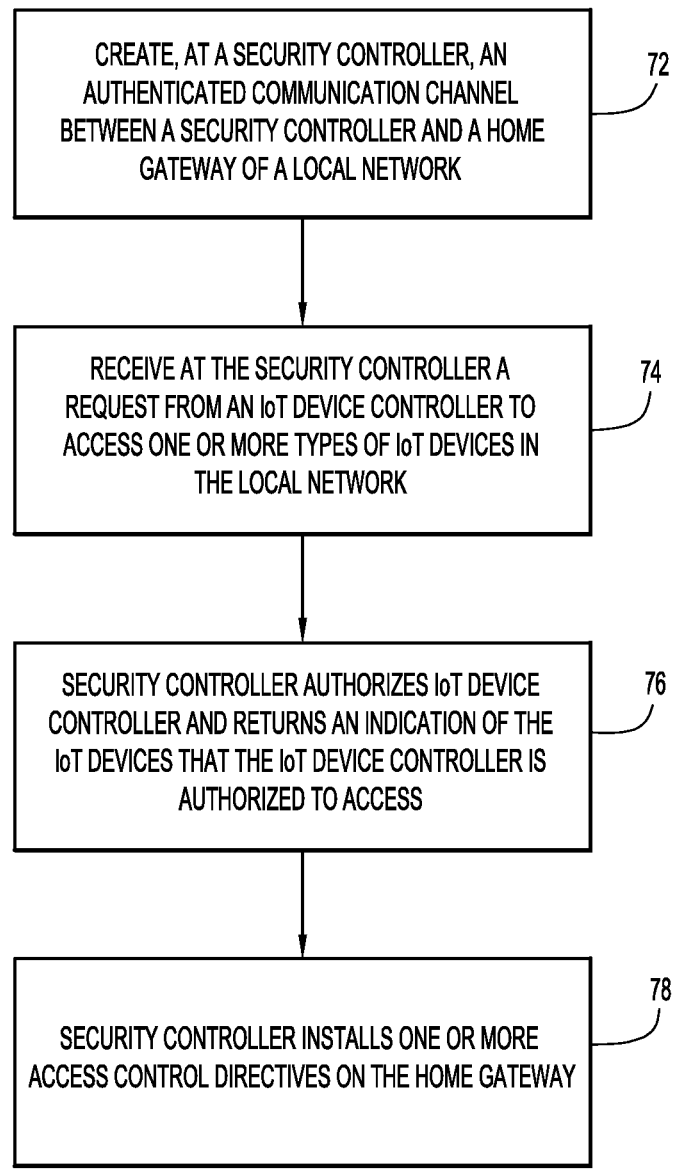
FIG. 6 is a flowchart illustrating a process running in a network device in accordance with retrieved usage descriptions, according to an example embodiment.

FIG. 6 is a flowchart of a general method 70 that covers the workflows shown in FIGS. 2, 3, and 5. More specifically, method 70 begins at 72 where an authenticated communication path/channel (authenticated connection) is created between a home gateway of a local network and a security controller sitting outside of the local network. At 74, the security controller receives, from an IoT device controller, a request to access one or more particular types of IoT devices (e.g., using the usage description URI as the identification of type of devices) located in (i.e., attached to) the local network.

At 76, the security controller authorizes the IoT device controller and returns an indication of the IoT devices that the IoT device controller is authorized to access (e.g., returns the set of URIs for which the IoT device controller is authorized to access). Optionally, the security controller also returns a list of network addresses of the devices that the IoT device controller can manage.

At 78, the security controller installs (instantiates) the one or more access control directions on the home gateway so that the home gateway permits access of the IoT device controller to the IoT devices in the local network. The IoT device controller can then manage the IoT devices for which it has been authorized. In one example, the security controller installs the network address of the IoT device controller in one or more access control lists on the home gateway.

As noted above, optional steps that may be included in the method 70. For example, the IoT device controller may report to the security controller when it needs more or less access to IoT devices in the local network, which may result in a change of authorization to the IoT device controller. The security controller may also periodically re-authorize the IoT device controller.

Figure 7:
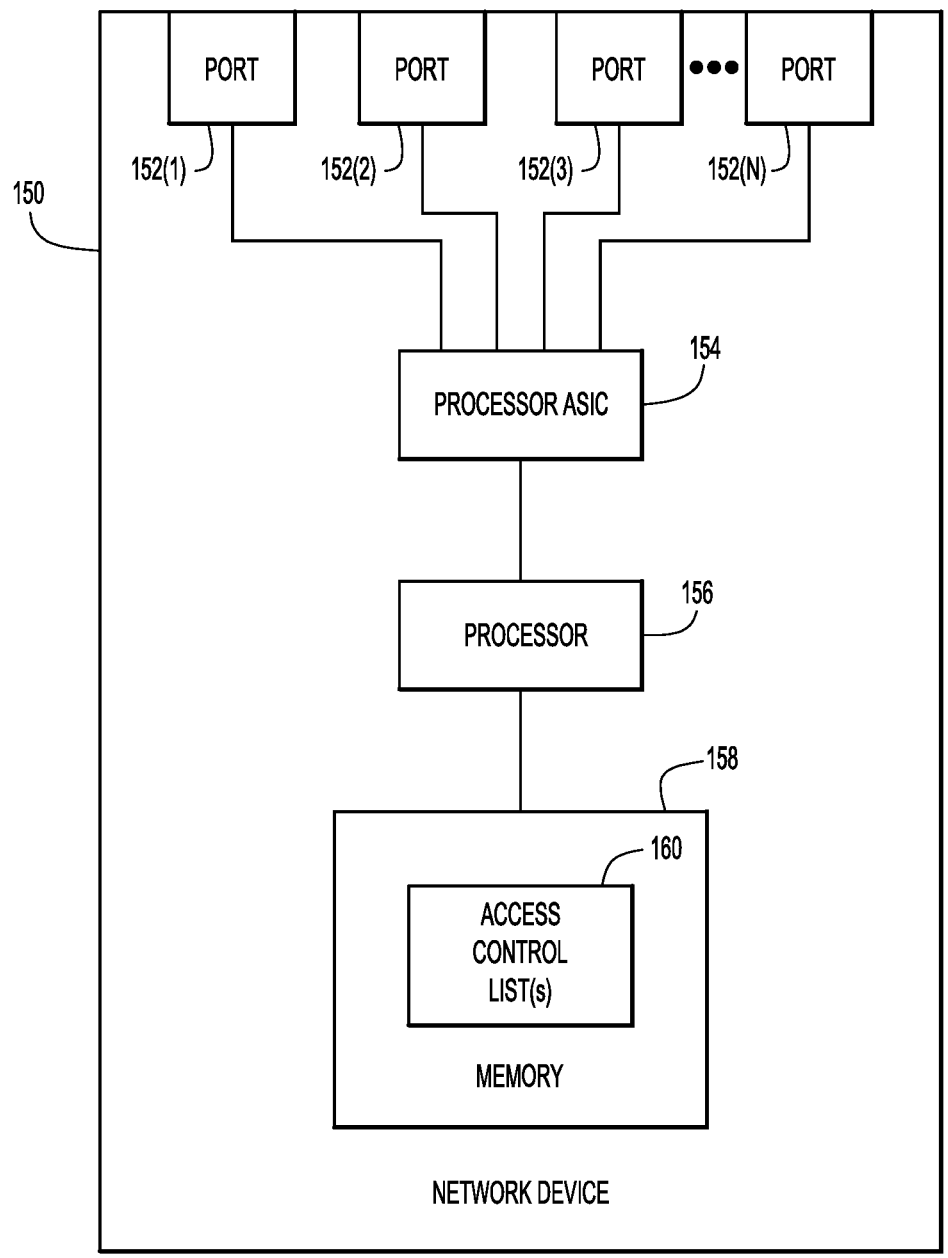
FIG. 7 is a block diagram of a network device configured to control access to a special purpose network connected devices, according to an example embodiment.
Figure 8:
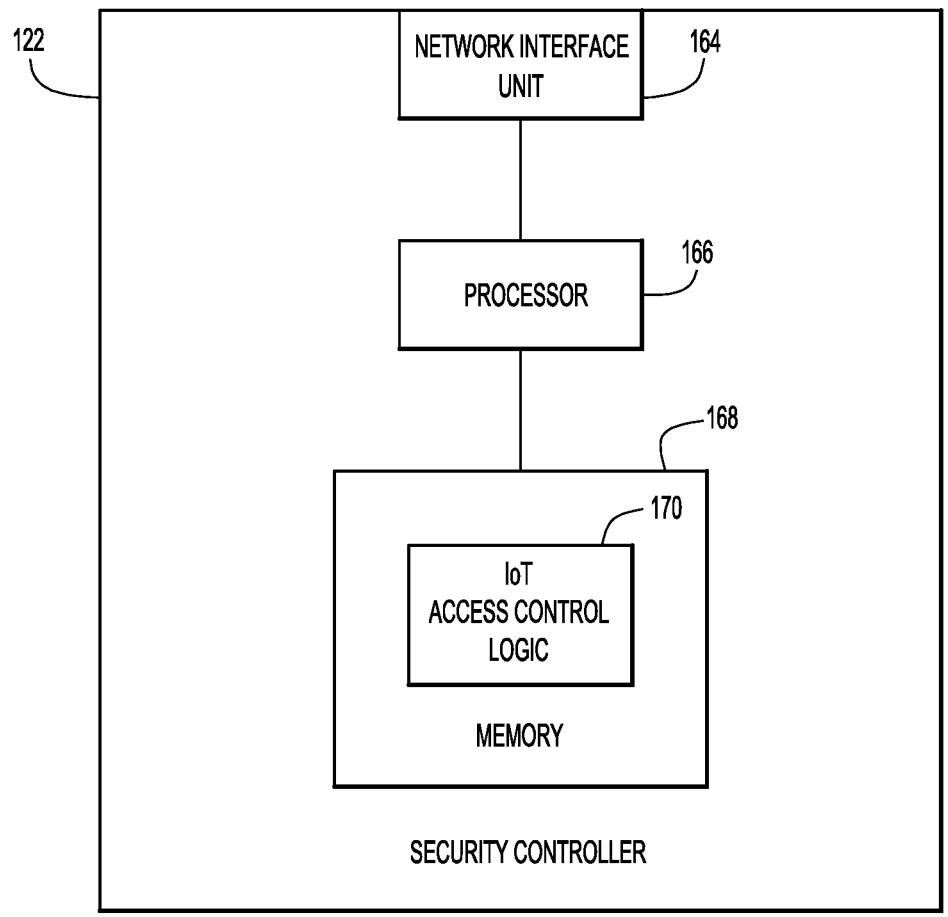
FIG. 8 is a block diagram of an Internet of Things (IoT) device controller, according to an example embodiment.
Figure 9:
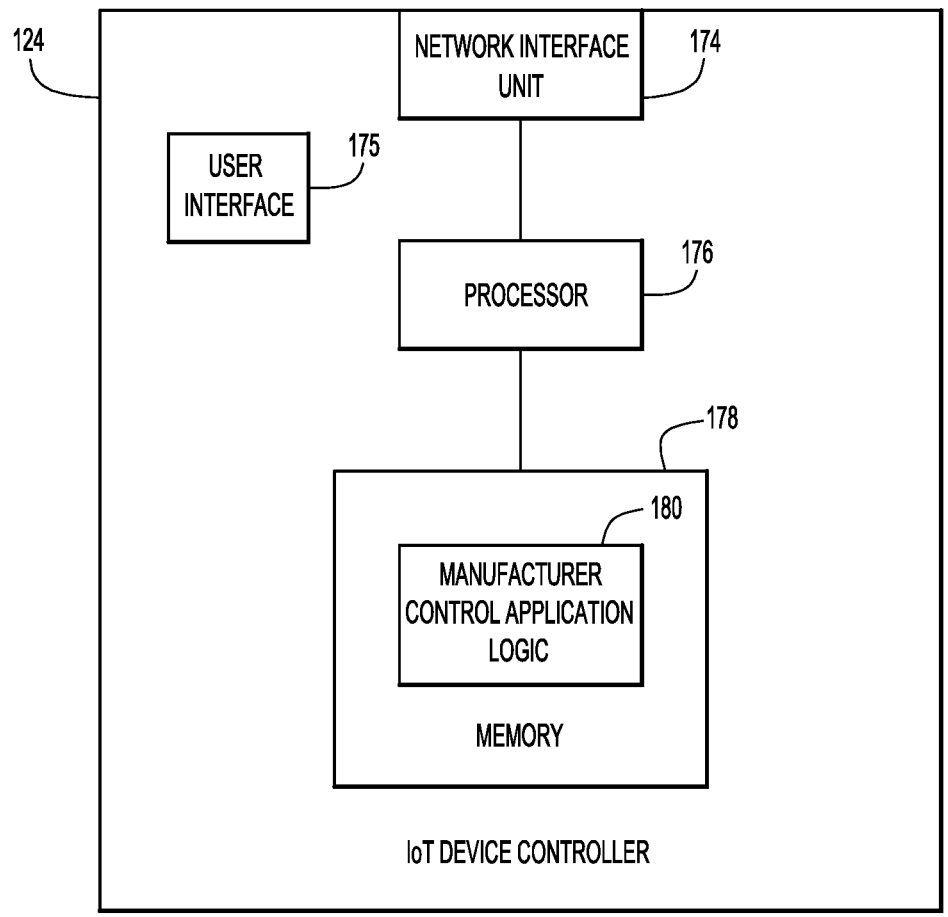
FIG. 9 is a block diagram of a security controller, according to an example embodiment.

Reference is now made to FIGS. 7-9. FIG. 7 illustrates a block diagram of a network device 150 (e.g., a home gateway or other security appliance, such as a firewall, intrusion prevention device, etc.) that is configured to participate in the techniques presented herein. The network device 150 includes a network interface unit in the form of a plurality of network ports 152(1)-152(N), a processor Application Specific Integrated Circuit (ASIC) 154 that performs network processing functions, one or more processors 156 (e.g., microprocessors or microcontrollers), and memory 158. The memory 158 stores one or more access control directives (e.g., access control lists) 160 which can be updated and maintained using the techniques described herein. It is to be understood that, in certain examples, the network device 150 may be a virtual (software-based) appliance.

The memory 158 may include read only memory (ROM), random access memory (RAM), magnetic disk storage media devices, optical storage media devices, flash memory devices, electrical, optical, or other physical/tangible memory storage devices. Thus, in general, the memory 158 may comprise one or more tangible (non-transitory) computer readable storage media (e.g., a memory device) encoded with software comprising computer executable instructions and when the software is executed (by the one or more processors 156) it is operable to perform the operations described herein.

FIGS. 8 and 9 are block diagrams of a security controller 122 and an IoT device controller 124, respectively. Referring first to FIG. 8, the security controller 122 is a computing device that includes a network interface unit 164 to enable network communications, one or more processors 166, and memory 168. The memory 168 stores IoT access control logic 170 that, when executed by the one or more processors 166, causes the one or more processors 166 to perform the operations described herein with reference to a security controller.

Referring next to FIG. 9, the IoT device controller 124 is a computing that includes a network interface unit 174 to enable network communications, one or more processors 176, and memory 178. The memory 178 stores executable instructions for manufacturer control application logic 180 that, when executed by the one or more processors 176, causes the one or more processors 176 to perform the operations described herein with reference to an IoT device controller (e.g., the operations of the manufacturer control application). The IoT device controller 124 also comprises a user interface 175. The user interface 175 includes one or more output devices, such as a liquid crystal display (LCD) and a speaker, for presentation of visual or audible information to a user. The user interface 486 also comprises one or more input devices that include, for example, a keypad, keyboard, mouse, touchscreen, etc.

The memory 168 and 178 shown in FIGS. 8 and 9, respectively, may include ROM, RAM, magnetic disk storage media devices, optical storage media devices, flash memory devices, electrical, optical, or other physical/tangible memory storage devices. Thus, in general, the memory 168 and 178 may each comprise one or more tangible (non-transitory) computer readable storage media (e.g., a memory device) encoded with software comprising computer executable instructions and when the software is executed (by the controller) it is operable to perform the operations described herein.

It is to be appreciated that the arrangements for the security controller 122 and the IoT device controller 124 shown in FIGS. 8 and 9, respectively, are examples and that the security controller 122 and the IoT device controller 124 may have different arrangement in accordance with alternative examples. For example, the security controller 122 may be virtualized and embodied as software processes running in a cloud computing/data center environment.

As noted above, the techniques presented herein capitalizes on a pre-existing customer/provider relationship to provide automated mechanisms for an IoT security controller to identify IoT device controls so that their network flows may be authorized with appropriate access lists on home gateways. Optionally, the techniques presented herein establish and maintains any necessary NAT mappings or provides necessary parameters to establish a VPN.

The techniques presented herein take advantage of a pre-existing relationship between a user and a security controller as and do not require per-instance manual configuration, thereby eliminating queries to the owner of the IoT device when access is remote. Furthermore, in certain arrangements no VPN configuration is maintained, because, when employed, it will be dynamically provided. Only access that is recommended by the manufacturer is granted to authorized devices (at most). When no devices are remote, remote access can entirely be disabled.

In summary, in one form, a method is provided comprising: at a security controller associated with a local network, establishing an authenticated communication channel between the security controller and a home gateway device of the local network; receiving, at the security controller, a request from a device controller to access one or more types of special purpose network connected devices in the local network; in response to the request, sending to the device controller an indication of at least one special purpose network connected device in the local network that the device controller is authorized to access; and installing, by the security controller, one or more access control directives on the home gateway device so that the device controller is permitted to access the at least one special purpose network connected device.

In another form, an apparatus is provided comprising: one or more network interface ports enabled for communication with a home gateway device of a local network and a device controller; a memory; and a processor configured to: establish an authenticated communication channel between the apparatus and the home gateway device, receive a request from the device controller to access one or more types of special purpose network connected devices in the local network, in response to the request, send to the device controller an indication of at least one special purpose network connected device in the local network that the device controller is authorized to access, and install one or more access control directives on the home gateway device so that the device controller is permitted to access the at least one special purpose network connected device.

In still another form, one or more non-transitory computer readable storage media are provided encoded with instructions that, when executed by a processor, cause the processor to: at a security controller associated with a local network, establish an authenticated communication channel between the security controller and a home gateway device of the local network; receive, at the security controller, a request from a device controller to access one or more types of special purpose network connected devices in the local network; in response to the request, send to the device controller an indication of at least one special purpose network connected device in the local network that the device controller is authorized to access; and install, by the security controller, one or more access control directives on the home gateway device so that the device controller is permitted to access the at least one special purpose network connected device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:
1. A method comprising:
    at a security controller associated with a local network, establishing an authenticated communication channel between the security controller and a home gateway device of the local network;

receiving, at the security controller, a request from a device controller to access one or more types of special purpose network connected devices in the local network;

in response to the request, sending, by the security controller to the device controller an indication of at least one special purpose network connected device in the local network that the device controller is authorized to access; and installing, by the security controller, one or more access control directives on the home gateway device, the one or more access control directives include a network address of the device controller, authorizing the device controller to access the at least one special purpose network connected device.

2. The method of claim 1, wherein receiving the request to access one or more types of special purpose network connected devices in the local network, comprises:

receiving a Uniform Resource Identifier associated with a usage description for each of the one or more types of special purpose network connected devices.

3. The method of claim 1, wherein sending the indication of the at least one special purpose network connected device in the local network that the device controller is authorized to access comprises:

sending a Uniform Resource Identifier associated with a usage description of the at least one special purpose network connected device.

4. The method of claim 1, wherein sending the indication of the at least one special purpose network connected device in the local network that the device controller is authorized to access comprises:

sending another network address of the at least one special purpose network connected device to the device controller.

5. The method of claim 1, further comprising:

building a network address translation (NAT) mapping on the home gateway device to facilitate communication between the device controller and the at least one special purpose network connected device.

6. The method of claim 1, further comprising:

at the security controller, authenticating the device controller prior to receiving the request from the device controller to access the one or more types of special purpose network connected devices in the local network, after installing the one or more access control directives on the home gateway device, the method further comprises:

at the security controller, re-authenticating the device controller;

determining, based on the re-authentication of the device controller, that the network address of the device controller has changed such that the device controller has an updated network address; and installing the updated network address of the device controller in the one or more access control directives on the home gateway device.

7. The method of claim 1, further comprising:

periodically re-authenticating the device controller and updating the one or more access control directives based on detecting an address change of the device controller.

8. The method of claim 1, further comprising:

authenticating, by the security controller, the device controller; and based on authenticating the device controller, populating, by the security controller, a controller field of the one or more access control directives, at the home gateway device, with the network address of the device controller that is authorized to access and control the at least one special purpose network connected device.

9. An apparatus comprising:

one or more network interface ports enabled for communication with a home gateway device of a local network and a device controller;

a memory; and a processor configured to:

establish an authenticated communication channel between the apparatus and the home gateway device, receive a request from the device controller to access one or more types of special purpose network connected devices in the local network, in response to the request, send, by the apparatus via the one or more network interface ports to the device controller, an indication of at least one special purpose network connected device in the local network that the device controller is authorized to access, and install one or more access control directives on the home gateway device, the one or more access control directives include a network address of the device controller, authorizing the device controller to access the at least one special purpose network connected device.

10. The apparatus of claim 9, wherein to receive the request to access one or more types of special purpose network connected devices in the local network, the processor is configured to:

receive a Uniform Resource Identifier associated with a usage description for each of the one or more types of special purpose network connected devices.

11. The apparatus of claim 9, wherein to send the indication of the at least one special purpose network connected device in the local network that the device controller is authorized to access, the processor is configured to:

send a Uniform Resource Identifier associated with a usage description of the at least one special purpose network connected device.

12. The apparatus of claim 9, wherein to send the indication of the at least one special purpose network connected device in the local network that the device controller is authorized to access, the processor is configured to:

send another network address of the at least one special purpose network connected device to the device controller.

13. The apparatus of claim 9, wherein the processor is further configured to:

build a network address translation (NAT) mapping on the home gateway device to facilitate the communication between the device controller and the at least one special purpose network connected device.

14. The apparatus of claim 9, wherein the processor is further configured to:

authenticate the device controller prior to receiving the request from the device controller to access the one or more types of special purpose network connected devices in the local network.

15. The apparatus of claim 14, wherein after installing the network address of the device controller in the one or more access control directives on the home gateway device, the processor is configured to:

re-authenticate the device controller;

determine, based on the re-authentication of the device controller, that the network address of the device controller has changed such that the device controller has an updated network address; and install the updated network address of the device controller in the one or more access control directives on the home gateway device.

16. The apparatus of claim 9, wherein after installing the network address of the device controller in the one or more access control directives on the home gateway device, the processor is configured to:

periodically re-authenticate the device controller; and updated the one or more access control directives on the home gateway device based on an address change of the device controller.

17. One or more non-transitory computer readable storage media encoded with instructions that, when executed by a processor, cause the processor to:

at a security controller associated with a local network, establish an authenticated communication channel between the security controller and a home gateway device of the local network;

receive, at the security controller, a request from a device controller to access one or more types of special purpose network connected devices in the local network;

in response to the request, send, by the security controller to the device controller an indication of at least one special purpose network connected device in the local network that the device controller is authorized to access; and install, by the security controller, one or more access control directives on the home gateway device, the one or more access control directives include a network address of the device controller, authorizing the device controller to access the at least one special purpose network connected device.

18. The non-transitory computer readable storage media of claim 17, wherein the instructions operable to receive the request to access one or more types of special purpose network connected devices in the local network, comprise instructions operable to:

receive a Uniform Resource Identifier associated with a usage description for each of the one or more types of special purpose network connected devices.

19. The non-transitory computer readable storage media of claim 17, wherein the instructions operable to send the indication of the at least one special purpose network connected device in the local network that the device controller is authorized to access comprise instructions operable to:

send a Uniform Resource Identifier associated with a usage description of the at least one special purpose network connected device.

20. The non-transitory computer readable storage media of claim 17, wherein the instructions operable to send the indication of the at least one special purpose network connected device in the local network that the device controller is authorized to access comprise instructions operable to:

send another network address of the at least one special purpose network connected device to the device controller.

* * * * *